Sept. 4, 1945.  C. L. ORR ET AL  2,384,129
SUPPORT FOR BRAKE RIGGING
Filed July 16, 1943  3 Sheets-Sheet 3

Inventors
C. L. Orr,
H. W. Stertzbach,
By Barry & Cyr
Attorneys

Patented Sept. 4, 1945

2,384,129

UNITED STATES PATENT OFFICE 2,384,129

SUPPORT FOR BRAKE RIGGING

Claude L. Orr and Harry W. Stertzbach, Columbus, Ohio, assignors to The Buckeye Steel Castings Company, Columbus, Ohio Application July 16, 1943, Serial No. 494,984

7 Claims. (Cl. 188—205)

This invention relates to new and useful improvements in supports for the brake rigging of six and eight wheel railway car trucks.

These improvements consist of a novel and improved bracket, cast integral with a side frame member, and a brake rigging supporting device secured to the bracket.

It is desirable to support a pull rod and the adjacent brake parts, from an unsprung side frame member, and this requires a relatively long bracket, which in previous designs was formed entirely by bending and welding flat plates and straps to the desired shape and riveting or bolting it to the side frame. Due to the heavy load which the bracket carried and its great length, inertia forces during operation sometimes caused loosening of the rivets or bolts by which it was fastened to the side frame, and also downward bending of the bracket, both of which allowed brake parts, which it supported, to move downwardly below normal position.

The main purpose of the present invention is to obviate these objectionable features. In our improved design the bracket is stiffened and strengthened, in a novel way, by casting all, or the greater portion of it, as an integral bracket on the side frame, and forming the remaining shorter portion from bent and welded plate or strap and fastening it to the side frame portion by rivets, bolts, or welding. This two piece construction of the bracket has the advantage that the short end portion, which is subject to wear, is replaceable.

The construction employed in the present invention can be best understood by reference to the accompanying drawings, in which.

Figure 3:
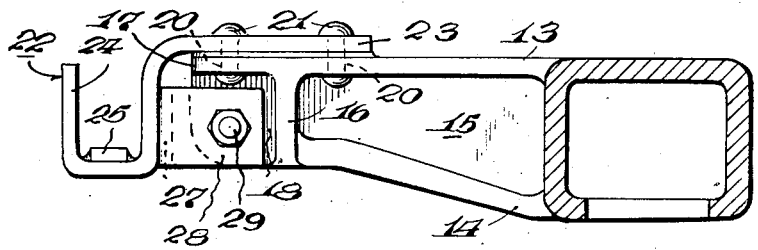
Fig. 3 is a side elevation of the bracket shown projecting from the side frame, illustrated in vertical transverse section.
Figure 4:
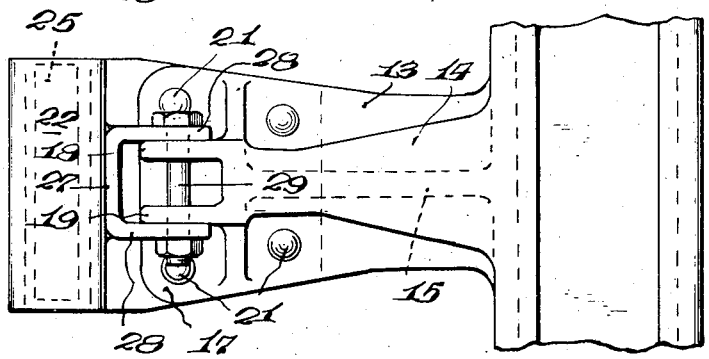
Fig. 4 is a bottom plan view of the structure shown in Fig. 3.

The invention is shown in connection with a car truck of the type in which axles (not shown) of the wheels 7 support in an unsprung manner side frames 8, carrying springs 9 on which rest a transverse bolster 10. In keeping with the invention the long portion 11 of a bracket is cast integral with the top portion 12 of the side frame. This portion projects inwardly from the side frame and consists of spaced top and bottom webs 13 and 14 (Figs. 3 and 4) joined by a central vertical rib 15. The bottom web and the rib terminate at a vertical rib 16 arranged transversely of the bracket and spaced from the end 17 of the top web, and extending downwardly from the underside thereof. Spaced vertical ribs 18 and 19 arranged longitudinally of the bracket join the top web and the outer face of the rib 16 and extend to the inner edge of top web 13. The top web is wider than the bottom one and is provided with holes 20 to receive rivets 21 or the like which secure the separable portion 22 of the bracket in place.

Figure 1:
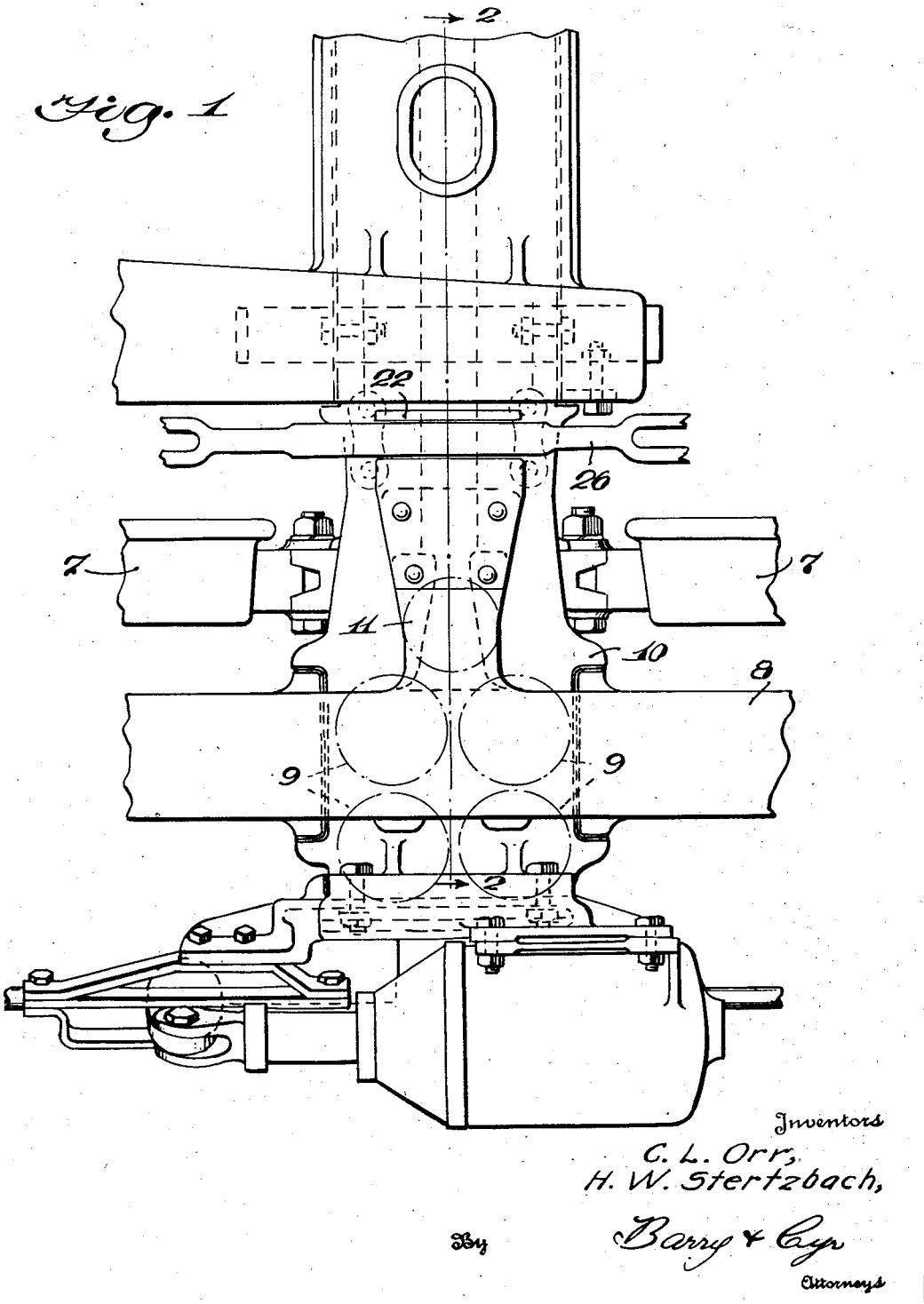
Fig. 1 is a fragmentary top plan view of a railway car truck.
Figure 2:
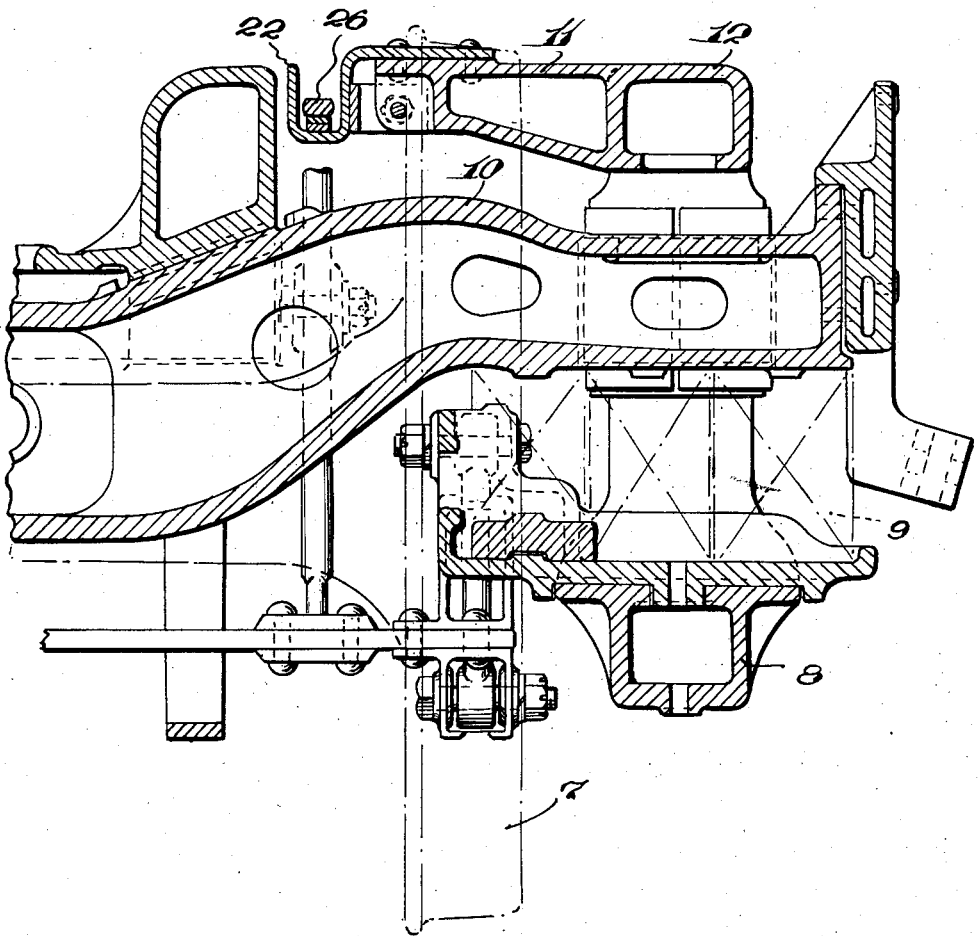
Fig. 2 is a transverse vertical sectional view of the same, taken on line 2—2 of Fig. 1.

The separable portion of the bracket is formed with a wide plate 23 which rests upon the top of the web 13 and is fastened thereto by riveting, bolting or welding. Beyond the end of the top web 13, plate 23 is bent to form a channel or trough 24, and a wear plate 25 is secured to the upper surface of the bottom thereof to support a pull rod 26 (Figs. 1 and 2) of the brake rigging. A second recumbent U-shaped part 27 is secured to the inner wall of the channel by welding or the like, and has spaced arms 28 embracing the ribs 18 and 19 of the integral portion of the bracket and secured thereto by means of a bolt 29.

Figure 5:
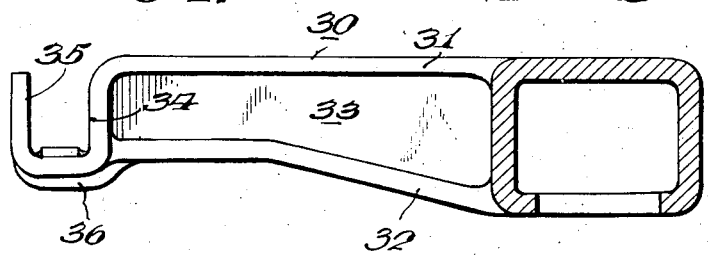
Figs. 5 and 6 are views similar to Figs. 3 and 4, respectively, but illustrating another modification.
Figure 6:
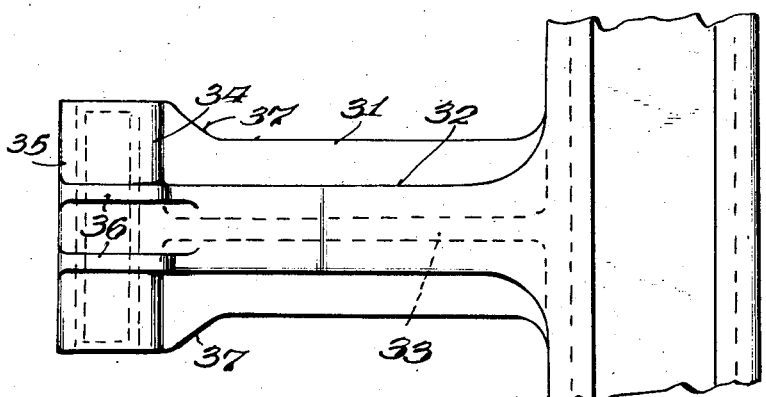

In Figs. 5 and 6, the bracket 30 is shown as entirely integral with the side frame, and comprises a wide top web 31 and narrower bottom web 32, connected by a longitudinal central vertical rib 33. The webs preferably converge toward their outer ends and they, as well as the rib, merge with a wall 34 of a channel or trough 35. The bottom of the trough is provided with spaced ribs 36 which extend across it and merge with the bottom web 32. For further reinforcement, the top web flares at its outer end, as indicated at 37 where it merges with the end portions of the channel.

Although we have illustrated the device as applied to an eight wheel truck it will be obvious that it may be used with other trucks having a greater or less number of wheels.

Manifestly the invention is not limited to the exact details of the illustrated constructions, since these may be variously modified and still fall within the terms of the following claims.

What we claim is:

1. A railway car truck side frame provided with a bracket adapted to support a pull rod, said bracket consisting of a long part and a short part, the long part being integral with the side frame and having outwardly extending end portions, and the short part being of channel shape and having inwardly extending portions rigidly united with said end portions of the long part.

2. A railway car truck side frame provided at its top portion with a bracket adapted to support a pull rod, said bracket consisting of a long part and a short part, the long part being integral with the side frame, and having top and bottom webs connected by a vertical rib extending longitudinally substantially throughout the central portion of the long part, said top web merging with the top of the side frame and said vertical rib merging with a side of the side frame immediately below the top thereof.

3. A railway car truck side frame provided at its top portion with a bracket adapted to support a pull rod, said bracket consisting of a long part and a short part, the long part being integral with the side frame, and having top and bottom webs converging toward their outer ends and connected by a vertical rib extending longitudinally substantially throughout the central portion of the long part, said top web merging with the top of the side frame and said vertical rib merging with a side of the side frame immediately below the top thereof.

4. A railway car truck side frame provided with a bracket adapted to support a pull rod, said bracket consisting of a long part and a short part, the long part being integral with the side frame and having top and bottom webs connected by a longitudinal rib, and the short part being of channel shape and provided with a horizontally extending plate which rests on and is secured to the long part.

5. A railway car truck side frame provided with a bracket adapted to support a pull rod, said bracket consisting of a long part and a short part, the long part being integral with the side frame and having top and bottom webs connected by a longitudinal rib, and the short part integral with the long part and having a channel extending transversely of the bracket.

6. A railway car truck side frame provided with a bracket adapted to support a pull rod, said bracket consisting of a long part and a short part, the long part being integral with the side frame, and provided with outwardly extending arms, the short part having a channel shaped portion provided with arms, and means detachably connecting the arms of the short part to the arms of the long part.

7. A railway car truck side frame provided with a bracket adapted to support a pull rod, said bracket consisting of a long part and a short part, the long part being integral with the side frame, and comprising top and bottom webs connected by a longitudinal rib, a transverse rib extending downwardly from the top web between the ends thereof and merging with the outer end of the bottom web, and the short part having a channel shaped portion arranged parallel to said transverse rib and connected to the latter.

CLAUDE L. ORR.
HARRY W. STERTZBACH.